US012241622B2

(12) United States Patent
Kim et al.

(10) Patent No.: US 12,241,622 B2
(45) Date of Patent: Mar. 4, 2025

(54) LIGHT SOURCE APPARATUS AND DISPLAY APPARATUS

(71) Applicant: SAMSUNG ELECTRONICS CO., LTD., Suwon-si (KR)

(72) Inventors: Hyungsuk Kim, Suwon-si (KR); Chunsoon Park, Suwon-si (KR); Youngmin Lee, Suwon-si (KR); Hyukjun Jang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/384,703

(22) Filed: Oct. 27, 2023

(65) Prior Publication Data

US 2024/0247776 A1 Jul. 25, 2024

Related U.S. Application Data

(63) Continuation of application No. PCT/KR2023/015574, filed on Oct. 11, 2023.

(30) Foreign Application Priority Data

Jan. 19, 2023 (KR) ........................ 10-2023-0008340

(51) Int. Cl.
*F21V 3/06* (2018.01)
*F21V 19/00* (2006.01)
*F21Y 115/10* (2016.01)

(52) U.S. Cl.
CPC ............ *F21V 3/06* (2018.02); *F21V 19/0025* (2013.01); *F21Y 2115/10* (2016.08)

(58) Field of Classification Search
CPC .... F21V 19/0025; F21V 19/0035; F21V 3/06; F21Y 2115/10
See application file for complete search history.

(56) References Cited

U.S. PATENT DOCUMENTS 7,530,723 B2 5/2009 Ohno
9,891,471 B2 2/2018 Kim et al.
(Continued)

FOREIGN PATENT DOCUMENTS

CN 213485228 U 6/2021
CN 213878136 U 8/2021
(Continued)

OTHER PUBLICATIONS

International Search Report dated Jan. 25, 2024 issued by the International Searching Authority in International Application No. PCT/KR2023/015574.
(Continued)

*Primary Examiner* — Karabi Guharay
(74) *Attorney, Agent, or Firm* — Sughrue Mion, PLLC

(57) ABSTRACT

A light source apparatus includes: a light source including a light emitting diode and an optical dome covering the light emitting diode; and a substrate supporting the light source, wherein the substrate may include: a conduction layer that is electrically conductive; a first protective layer disposed on the conduction layer and on which the optical dome is disposed, the first protective layer including a first exposed portion exposing a portion of the conduction layer to connect the conduction layer and the light emitting diode; and a second protective layer disposed on the first protective layer, the second protective layer including a second exposed portion exposing a portion of the first protective layer at which the optical dome is disposed on the first protective layer.

15 Claims, 15 Drawing Sheets

(56) References Cited

U.S. PATENT DOCUMENTS

| | | | |
|---|---|---|---|
| 11,366,355 B2 | 6/2022 | Kim et al. | |
| 2017/0179345 A1* | 6/2017 | Yamada | H01L 33/505 |
| 2018/0335667 A1 | 11/2018 | Wang et al. | |
| 2018/0366617 A1* | 12/2018 | Yamada | H01L 33/505 |
| 2021/0180755 A1* | 6/2021 | Park | F21K 9/69 |
| 2022/0128864 A1* | 4/2022 | Jang | H01L 25/0753 |
| 2023/0244105 A1 | 8/2023 | Park et al. | |

FOREIGN PATENT DOCUMENTS

| | | | |
|---|---|---|---|
| JP | 4835936 | B2 | 12/2023 |
| KR | 10-2005-0027655 | A | 3/2005 |
| KR | 10-2008-0070280 | A | 7/2008 |
| KR | 10-1568747 | B1 | 11/2015 |
| KR | 10-2017-0050993 | A | 5/2017 |
| KR | 10-2018-0127246 | A | 11/2018 |
| KR | 10-1997239 | B1 | 7/2019 |
| KR | 10-2021-0047204 | A | 4/2021 |
| KR | 10-2022-0000710 | A | 1/2022 |
| KR | 10-2022-0054107 | A | 5/2022 |
| KR | 10-2022-0076825 | A | 6/2022 |

OTHER PUBLICATIONS

Written Opinion dated Jan. 25, 2024 issued by the International Searching Authority in International Application No. PCT/KR2023/015574.

* cited by examiner

LIGHT SOURCE APPARATUS AND DISPLAY APPARATUS

CROSS REFERENCE TO RELATED APPLICATIONS

The present application is a continuation of International Application No. PCT/KR2023/015574 filed on Oct. 11, 2023, which claims benefit of priority to Korean Patent Application No. 10-2023-0008340 filed on Jan. 19, 2023 in Korean Intellectual Property Office. The contents of the above applications are hereby incorporated by reference.

BACKGROUND

1. Field

The present disclosure relates to a light source apparatus and display apparatus.

2. Description of the Related Art

In general, a display apparatus converts obtained or stored electrical information into visual information and displays the converted information to a user.

As the display apparatus, there are a monitor device connected to a personal computer or a server computer, a portable computer device, a navigation terminal device, a general television device, an internet protocol television (IPTV) device, a smart phone, a tablet PC, a personal digital assistant (PDA), a portable terminal device such as a cellular phone, various display apparatuses used to reproduce images such as advertisements or movies at industrial sites, various other types of audio/video system, and the like.

The display apparatus may include a light source module to convert electrical information into visual information. The light source module may include a plurality of light sources for independently emitting light.

In the related art, a light source apparatus includes a reflective sheet. The reflective sheet may reflect light emitted from a light source in a forward direction or in a direction close to the forward direction. A plurality of passing holes may be formed on the reflective sheet at positions corresponding to a plurality of the light sources of a light source module, respectively. The reflective sheet may be attached to one surface of a substrate of the light source apparatus. The plurality of light sources may be positioned in the plurality of passing holes in a state in which the reflective sheet is attached to the substrate. At least some of the plurality of light sources may be provided to be positioned in front of the reflective sheet, and the substrate may be provided to be positioned in the rear of the reflective sheet. The reflective sheet corresponds to a main component that affects the light brightness performance and/or Mura performance of the light source apparatus. Accordingly, the conventional light source apparatus inevitably includes the reflective sheet.

The reflective sheet may be attached to the substrate of the light source module using a manual and/or semi-automatic attachment jig. A process of attaching the reflective sheet to the substrate of the light source module as described above may require skilled manpower and a lot of time.

For example, when the reflective sheet is incorrectly attached to the substrate, the reflective sheet must be detached from the substrate again, and the reflective sheet detached from the substrate may not be recycled. In addition, it may be very difficult to attach the reflective sheet to the substrate so that the passing holes formed on the reflective sheet correspond to the light sources. For example, an attachment tolerance of about −0.5 mm to +0.5 mm may be allowed. In addition, when the reflective sheet is attached manually, foreign substances may enter the light source apparatus. The process of attaching the reflective sheet to the light source module may be inefficient.

In addition, a large amount of static electricity may be generated when the reflective sheet is detached from a base film having an adhesive surface, and the light source module may be damaged by static electricity.

SUMMARY

Provided is a light source apparatus and a display apparatus capable of omitting a reflective sheet.

Provided is a light source apparatus and a display apparatus capable of improving productivity.

Provided is a light source apparatus and a display apparatus capable of reducing the number of processes and material costs.

Provided is a light source apparatus and a display apparatus capable of securing brightness and/or Mura performance.

Provided is a light source apparatus and a display apparatus including an antistatic member for suppressing or preventing damage to a light source due to static electricity.

Technical tasks to be achieved in this document are not limited to the technical tasks mentioned above, and other technical tasks not mentioned will be clearly understood by those skilled in the art from the description below.

According to an aspect of the disclosure, a light source apparatus includes: a light source including a light emitting diode and an optical dome covering the light emitting diode; and a substrate supporting the light source, wherein the substrate may include: a conduction layer that is electrically conductive; a first protective layer disposed on the conduction layer and on which the optical dome is disposed, the first protective layer including a first exposed portion exposing a portion of the conduction layer to connect the conduction layer and the light emitting diode; and a second protective layer disposed on the first protective layer, the second protective layer including a second exposed portion exposing a portion of the first protective layer at which the optical dome is disposed on the first protective layer.

The first protective layer may include an antistatic pad provided around the optical dome and configured to protect the light emitting diode from electrostatic discharge, and the second protective layer may cover the antistatic pad.

The first protective layer may further include a third exposed portion that is spaced apart from the first exposed portion and at which a portion of the conduction layer is exposed at the antistatic pad.

An edge of the second exposed portion may be spaced apart from the optical dome and surround the optical dome.

The optical dome may be within a region of the second exposed portion.

The light emitting diode connected to the first exposed portion and the conduction layer through the first exposed portion may be within a region of the second exposed portion.

The first exposed portion may be exposed by the second exposed portion in a direction toward the light source of the substrate.

The second exposed portion may have a diameter that is greater than or equal to 2 mm and less than or equal to 4 mm.

The second protective layer may have a thickness that is greater than or equal to 20 μm and less than or equal to 50 μm.

A step may be stepped from an edge of the second exposed portion to a surface of the first protective layer.

The optical dome may include silicon or epoxy resin formed onto the light emitting diode and exposed through the second exposed portion.

The first protective layer and the second protective layer may be formed by a photo solder resist (PSR).

The light source apparatus may further include a plurality of antistatic pads, including the antistatic pad.

The substrate may further include an insulation layer supporting the conduction layer.

The conduction layer may be a first conduction layer, and the substrate may further include a second conduction layer supporting the insulation layer.

BRIEF DESCRIPTION OF THE DRAWINGS

The above and other aspects, features, and advantages of certain embodiments of the present disclosure will be more apparent from the following description taken in conjunction with the accompanying drawings in which.

DETAILED DESCRIPTION

Various embodiments and terms in this document are not intended to limit the technical features described in this document to specific embodiments, and should be understood to include various modifications, equivalents, or substitutes of the embodiments.

In connection with the description of the drawings, like reference numbers may be used for like or related elements.

The singular form of a noun corresponding to an item may include one item or a plurality of items, unless the relevant context clearly dictates otherwise.

In this document, each of phrases such as "A or B," "at least one of A and B," "at least one of A or B," "A, B or C," "at least one of A, B and C," and "at least one of A, B, or C" may include any one of the items listed together in the corresponding one of the phrases, or all possible combinations thereof.

The term "and/or" includes any combination of a plurality of related components or any one of a plurality of related components.

Terms such as "first," "second," "primary," and "secondary" may simply be used to distinguish a given component from other corresponding components, and do not limit the corresponding components in any other respect (e.g., importance or order).

When any (e.g., first) component is referred to as being "coupled" or "connected" to another (e.g., second) component with or without the terms "functionally" or "communicatively", this means that the any component may be connected to the other component directly (e.g., by a wire), wirelessly, or through a third component.

The terms "comprises" and "has" are intended to indicate that there are features, numbers, steps, operations, components, parts, or combinations thereof described in this document, and do not exclude the presence or addition of one or more other features, numbers, steps, operations, components, parts, or combinations thereof.

When any component is referred to as being "connected", "coupled", "supported" or "in contact" with another component, this includes a case in which the components are indirectly connected, coupled, supported, or in contact with each other through a third component as well as directly connected, coupled, supported, or in contact with each other.

When any component is referred to as being located "on" or "over" another component, this includes not only a case in which any component is in contact with another component but also a case in which another component is present between the two components.

The terms "front-rear direction," "front," "rear," "up-down direction," "upper portion," "lower portion," "upper side," "lower side," and the like used in the following description are defined with reference to the drawings, and the shape and position of each component are not limited by these terms.

Hereinafter, embodiments according to the present disclosure will be described in detail with reference to the accompanying drawings.

Figure 1:
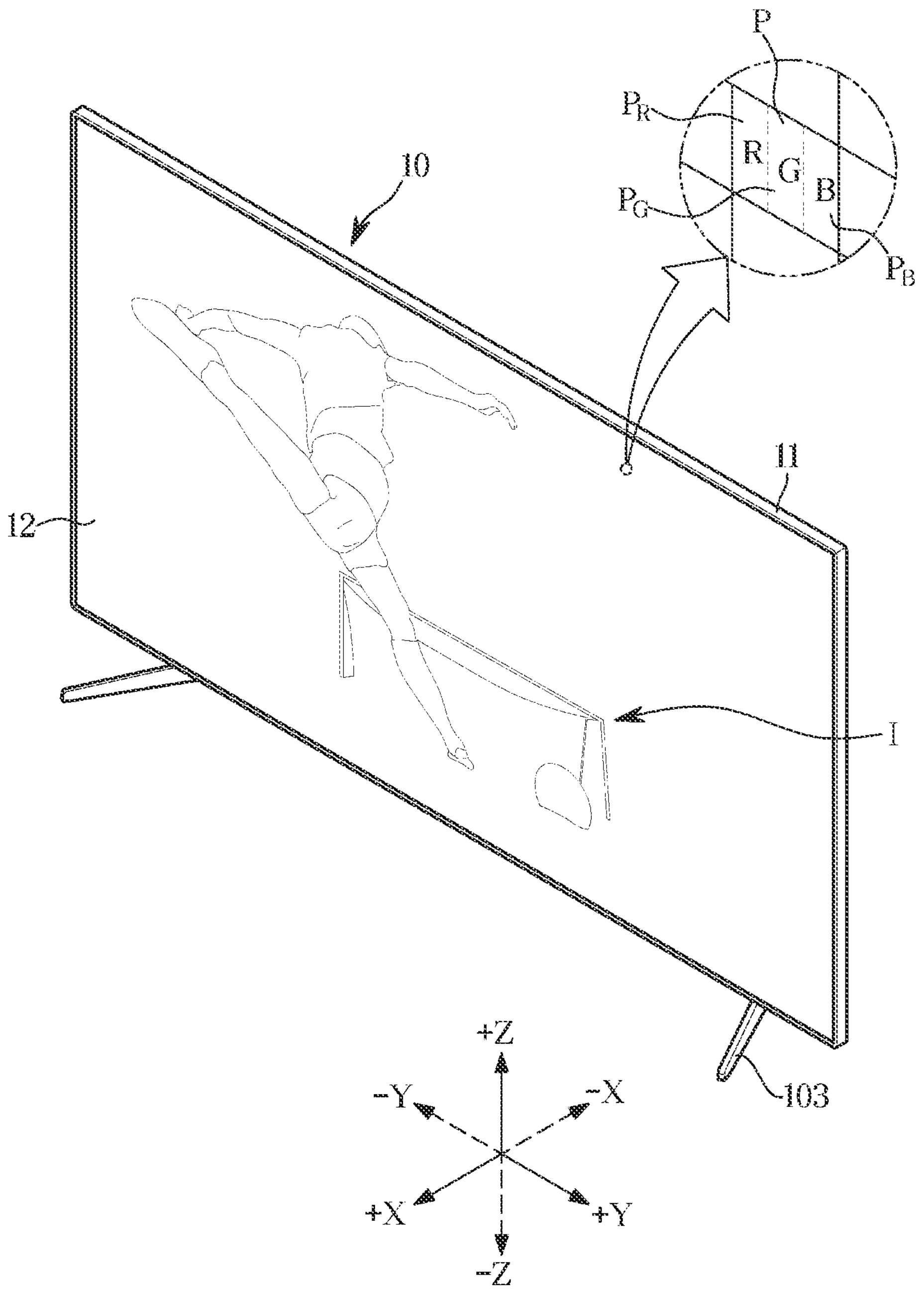
FIG. 1 is a perspective view of a display apparatus according to an embodiment.
Figure 2:
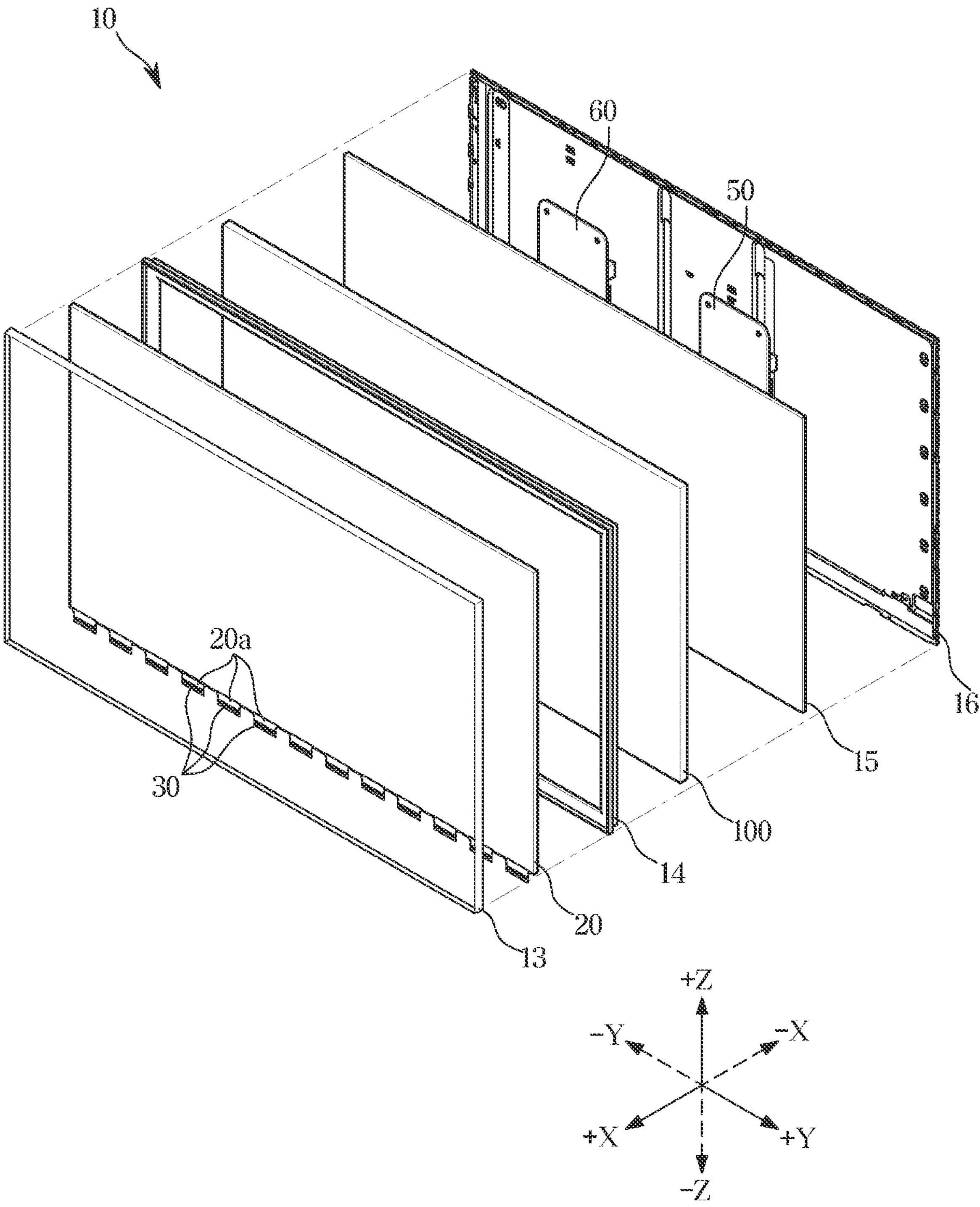
FIG. 2 is an exploded perspective view of the display apparatus according to an embodiment.
Figure 3:
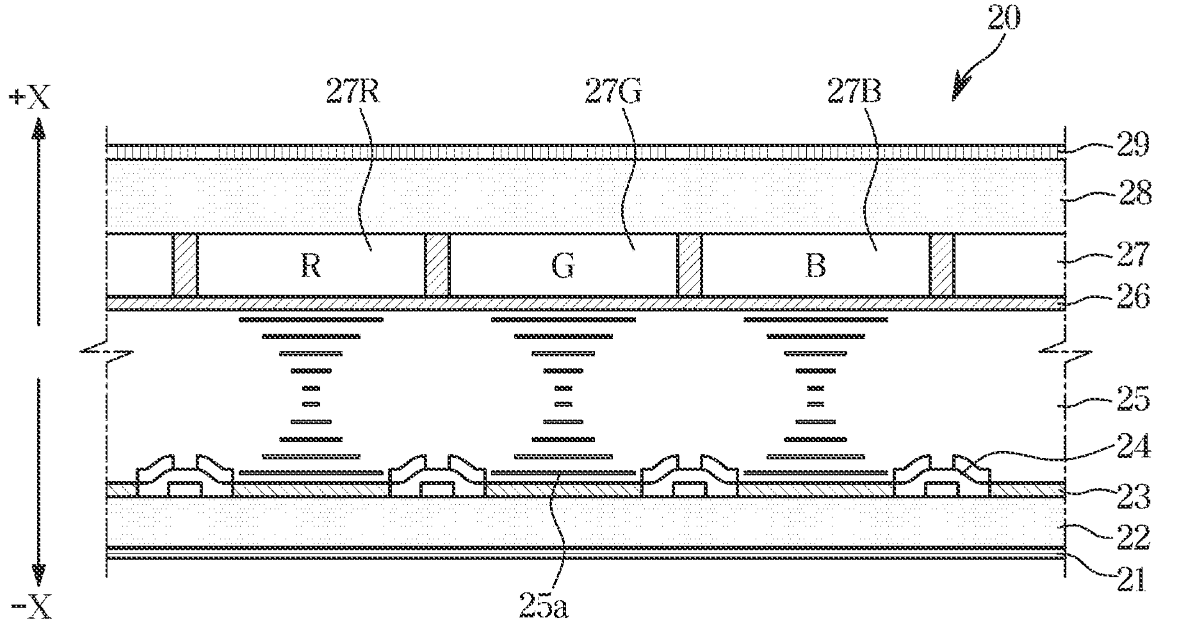
FIG. 3 is a side cross-sectional view of a display panel according to an embodiment.

FIG. 1 is a perspective view of a display apparatus according to an embodiment. FIG. 2 is an exploded perspective view of the display apparatus according to an embodiment. FIG. 3 is a side cross-sectional view of a display panel according to an embodiment.

Referring to FIG. 1, a display apparatus 10 is an apparatus capable of processing an image signal received from the outside and visually displaying the processed image. Hereinafter, a case in which the display apparatus 10 is a television (TV) is exemplified, but is not limited thereto. For example, the display apparatus 10 may be implemented in various forms such as a monitor, a portable multimedia device, and a portable communication device, and the form of the display apparatus 10 is not limited as long as it is an apparatus that visually displays an image.

In addition, the display apparatus 10 may be a large format display (LFD) installed outdoors such as on the roof of a building and at a bus stop. Herein, the display apparatus is not limited to being installed outdoors, and the display apparatus 10 according to one or more embodiments may be installed in any place where a large number of people may come and go, even indoors, such as a subway station, shopping mall, movie theater, company, and store.

The display apparatus 10 may receive content data including video data and audio data from various content sources, and output video and audio corresponding to the video data and audio data. For example, the display apparatus 10 may receive content data through a broadcast reception antenna or a wired cable, receive content data from a content reproducing device, or receive content data from a content providing server of a content provider.

Referring to FIG. 1, the display apparatus 10 may include a main body 11. The display apparatus 1 may include a screen 12 displaying an image I.

The display apparatus 10 may include a support 103 provided below the main body 11 to support the main body 11.

The main body 11 may form an outer shape of the display apparatus 10. Inside the main body 11, components for the display apparatus 10 to display the image I or to perform various functions may be provided. The main body 11 illustrated in FIG. 1 has a flat plate shape, but the shape of the main body 11 is not limited to that illustrated in FIG. 1. For example, the main body 11 may have a curved plate shape.

The screen 12 may display the image I. For example, the screen 12 may display a still image or a moving image. For example, the screen 12 may display a two-dimensional flat image or a three-dimensional stereoscopic image using the parallax of both eyes of a user. For example, the screen 12 may be formed on a front surface of the main body 11.

A plurality of pixels P may be formed on the screen 12. The image I displayed on the screen 12 may be formed by light emitted from each of the plurality of pixels P. For example, the image I may be formed on the screen 12 by combining the light emitted from the plurality of pixels P in a mosaic-like manner.

Each of the plurality of pixels P may emit light of variable brightness and various colors. For example, each of the plurality of pixels P may include a self-emitting panel (e.g., a light emitting diode panel) capable of directly emitting light, or include a non-light emitting panel (e.g., a display panel) capable of passing or blocking light emitted by a light source apparatus or the like.

In order to emit light of various colors, each of the plurality of pixels P may include a red subpixel PR, a green subpixel PG, and a blue subpixel PB.

Each of the plurality of pixels P may include the red subpixel PR capable of emitting red light, the green subpixel PG capable of emitting green light, and the blue subpixel PB capable of emitting blue light. For example, the red light may represent light in a wavelength range of about 620 nm to 750 nm (nanometer, one-billionth of a meter). For example, the green light may represent light in a wavelength range of about 495 nm to 570 nm. For example, the blue light may represent light in a wavelength range of about 450 nm to 495 nm.

By combining the red light from the red subpixel PR, the green light from the green subpixel PG, and the blue light from the blue subpixel PB, light of variable brightness and various colors may be emitted from each of the plurality of pixels P.

As illustrated in FIG. 2, various components for generating the image I on the screen S may be provided inside the main body 11.

The display apparatus 10 may include a light source apparatus 100. For example, the light source apparatus 100 may be a surface light source.

The display apparatus 10 may include a display panel 20 provided to block or pass light emitted from the light source apparatus 100.

For example, the display apparatus 10 may include a control assembly 50 configured to control operations of the light source apparatus 100 and/or the display panel 20. For example, the display apparatus 10 may include a power assembly 60 configured to supply power to the light source apparatus 100 and/or the display panel 20.

For example, the main body 11 may include a chassis provided to support and fix the display panel 20, the light source apparatus 100, the control assembly 50, and/or the power assembly 60. For example, the chassis may include at least one of a bezel 13, a frame middle mold 14, a bottom chassis 15, and a rear cover 16.

For example, the light source apparatus 100 may include a point light source provided to emit monochromatic light or white light, and refract, reflect, and scatter light in order to convert light emitted from the point light source into uniform surface light. For example, the light source apparatus 100 may include a plurality of light sources 111 (see FIG. 4 for example) provided to emit monochromatic light or white light. For example, the light source apparatus 100 may include a diffusion plate 120 (see FIG. 4 for example) provided to diffuse light incident from the plurality of light sources. For example, the light source apparatus 100 may include an optical sheet 130 (see FIG. 4 for example) provided to refract and scatter light emitted from a front surface of the diffusion plate.

As such, the light source apparatus 100 may emit uniform surface light toward the front by refracting, reflecting, and scattering light emitted from the light source.

The configuration of the light source apparatus 100 will be described in more detail below.

The display panel 20 may be provided in front of the light source apparatus 100. The display panel 20 may block or pass light emitted from the light source apparatus 100 to form the image I.

A front surface of the display panel 20 may form the screen S of the display apparatus 10. The display panel 20 may form the plurality of pixels P. Each of the plurality of pixels P may independently block or pass light of the light source apparatus 100, and the light passed through the plurality of pixels P may form the image I displayed on the screen S.

For example, as illustrated in FIG. 3, the display panel 20 may include a first polarizing film 21, a first transparent substrate 22, and a pixel electrode 23, a thin film transistor 24, a liquid crystal layer 25, a common electrode 26, a color filter 27, a second transparent substrate 28, and a second polarizing film 29.

The first transparent substrate 22 and the second transparent substrate 28 may fix and support the pixel electrode 23, the thin film transistor 24, the liquid crystal layer 25, the common electrode 26, and the color filter 27. For example, the first substrate 22 and the second transparent substrate 28 may be made of tempered glass or transparent resin.

The first polarizing film 21 and the second polarizing film 29 are provided on outer sides of the first substrate 22 and the second transparent substrate 28, respectively.

The first polarizing film 21 and the second polarizing film 29 may pass specific light and block other light. For example, the first polarizing film 21 passes light having a magnetic field vibrating in a first direction and blocks other light. The second polarizing film 29 passes light having a magnetic field vibrating in a second direction and blocks other light. In this case, the first direction and the second direction may be orthogonal to each other. Accordingly, a polarization direction of light passing through the first polarizing film 21 and a vibration direction of light passing through the second polarizing film 29 are orthogonal to each other. As a result, light generally may not pass through the first polarizing film 21 and the second polarizing film 29 at the same time.

The color filter 27 may be provided on an inner side of the second transparent substrate 28.

The color filter 27 may include, for example, a red filter 27R passing red light, a green filter 27G passing green light, and a blue filter 27B passing blue light. The red filter 27R, the green filter 27G, and the blue filter 27B may be disposed parallel to each other. A region in which the color filter 27 is formed may correspond to the pixel P. A region in which the red filter 27R is formed may correspond to the red subpixel PR. A region in which the green filter 27G is formed may correspond to the green subpixel PG. A region in which the blue filter 27B is formed may correspond to the blue subpixel PB.

The pixel electrode 23 may be provided on an inner side of the first transparent substrate 22. The common electrode 26 may be provided on the inner side of the second transparent substrate 28.

The pixel electrode 23 and the common electrode 26 may be made of a metal material conducting electricity and may generate an electric field for changing an arrangement of liquid crystal molecules 25*a* constituting the liquid crystal layer 25, which will be described below.

The pixel electrode 23 and the common electrode 26 may be made of a transparent material and may pass light incident from the outside. For example, the pixel electrode 23 and the common electrode 26 may include indium tin oxide (ITO), indium zinc oxide (IZO), silver nanowire, carbon nanotube (CNT), graphene, or PEDOT (3,4-ethylenedioxythiophene).

The thin film transistor (TFT) 24 may be provided on the inner side of the second transparent substrate 28.

The thin film transistor 24 may pass or block current flowing through the pixel electrode 23. For example, when the thin film transistor 24 is turned on or off, an electric field may be formed or removed between the pixel electrode 23 and the common electrode 26.

The thin film transistor 24 may be composed of polysilicon and may be formed by a semiconductor process such as lithography, deposition, and ion implantation.

The liquid crystal layer 25 may be formed between the pixel electrode 23 and the common electrode 26. The liquid crystal layer 25 may be filled with the liquid crystal molecules 25*a*.

Liquid crystal represents an intermediate state between a solid (crystal) and a liquid. Most of liquid crystal substances are organic compounds, and molecules thereof have a thin and long rod shape and may be arranged in a disordered state in some directions, but in the form of regular crystals in the other directions. As a result, the liquid crystal has both liquid fluidity and crystal (solid) optical anisotropy.

The liquid crystal also exhibits optical properties depending on changes of the electric field. For example, a direction of molecular arrangement constituting the liquid crystal may be changed depending on a change of the electric field. When the electric field is generated in the liquid crystal layer 25, liquid crystal molecules 115*a* of the liquid crystal layer 25 may be arranged depending on a direction of the electric field, and when the electric field is not generated in the liquid crystal layer 25, the liquid crystal molecules 115*a* may be irregularly arranged or may be arranged along an alignment layer. As a result, the optical properties of the liquid crystal layer 25 may vary depending on whether or not an electric field passing through the liquid crystal layer 25 exists.

A cable 20*a* provided to transmit image data to the display panel 20, and a display driver integrated circuit (DDI) 30 (hereinafter, referred to as 'driver IC') provided to process digital image data to output an analog image signal may be provided on one side of the display panel 20.

The cable 20*a* may electrically connect the control assembly 50 and/or the power assembly 60 and the driver IC 30. The cable 20*a* may electrically connect the driver IC 30 and the display panel 20. For example, the cable 20*a* may include a flexible flat cable that may be bent or a film cable.

The driver IC 30 may receive image data and power from the control assembly 50 and/or the power assembly 60 through the cable 20*a*. The driver IC 30 may transmit image data and a driving current to the display panel 20 through the cable 20*a*.

The cable 20*a* and the driver IC 30 may be integrally provided. For example, the cable 20*a* and the driver IC 30 may be implemented as a film cable, a chip on film (COF), a tape carrier packet (TCP), or the like. In other words, the driver IC 30 may be disposed on the cable 20*a*. However, the present disclosure is not limited thereto, and the driver IC 30 may be disposed on the display panel 20.

The control assembly 50 may include a control circuit provided to control an operation of the display panel 20 and/or the light source apparatus 100. The control circuit may process image data received from an external content source, transmit the image data to the display panel 20, and transmit dimming data to the light source apparatus 100.

The power assembly 60 may supply power to the light source apparatus 100 so that the light source apparatus 100 outputs light. The power assembly 60 may supply power to the display panel 20 so that the display panel 20 blocks or passes light of the light source apparatus 100.

The control assembly 50 may be implemented with a printed circuit board and various circuits mounted on the printed circuit board. The power assembly 60 may be implemented with a printed circuit board and various circuits mounted on the printed circuit board. For example, the control circuit may include a memory, a processor, and a control circuit board on which the memory and the processor are mounted. For example, the power circuit may include a capacitor, a coil, a resistor element, a processor, and a power circuit board on which the capacitor, the coil, the resistor element, and the processor are mounted.

Figure 4:
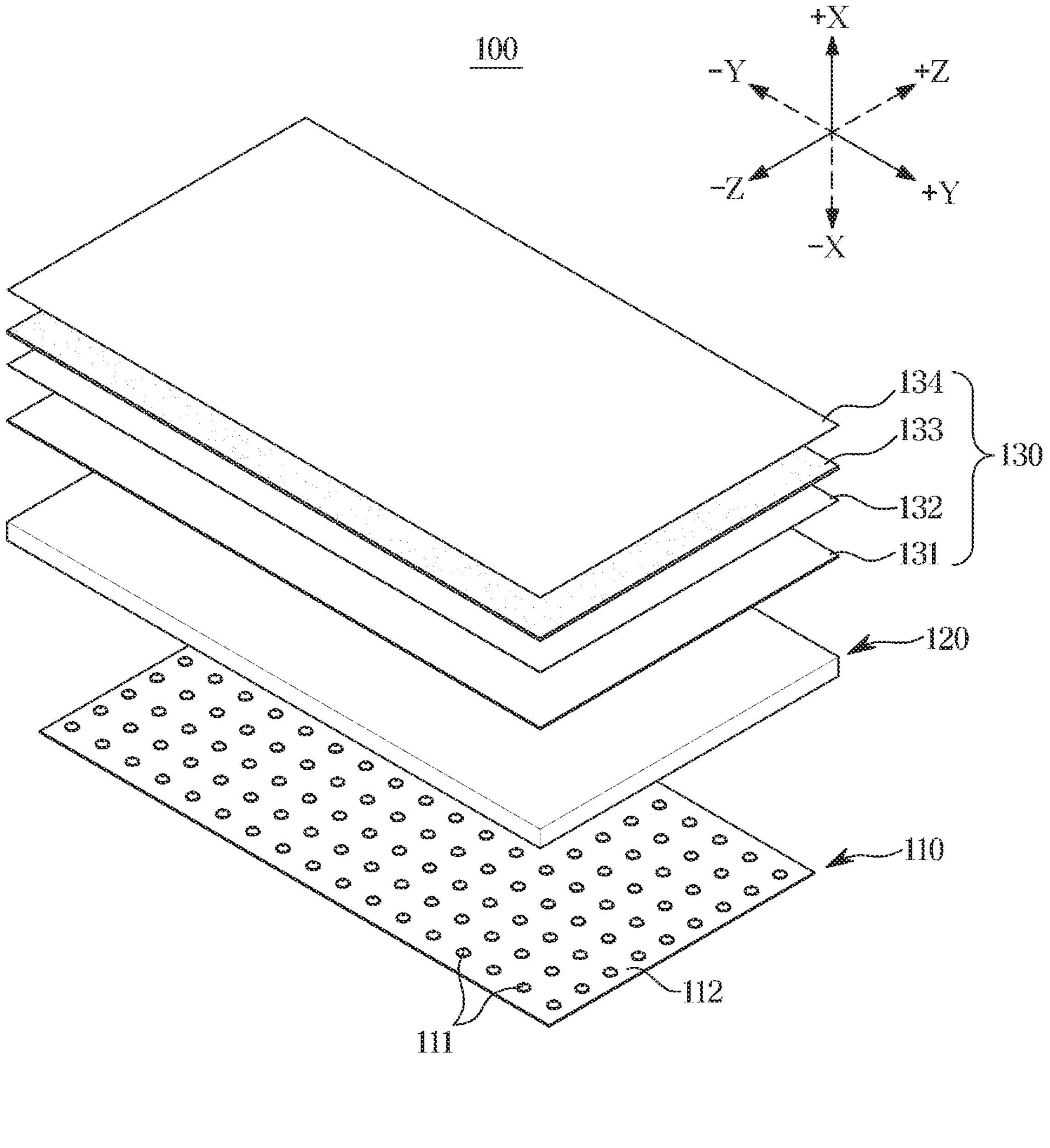
FIG. 4 is an exploded perspective view of a light source apparatus according to an embodiment.

FIG. 4 is an exploded perspective view of a light source apparatus according to an embodiment.

The light source apparatus 100 may include a light source module 110 provided to generate light. The light source apparatus 100 may include the diffuser plate 120 provided to uniformly diffuse light. The light source apparatus 100 may include the optical sheet 130 provided to improve the brightness of emitted light.

The light source apparatus 100 may be disposed on the rear of the display panel 20 (see FIG. 2 for example). The light source apparatus 100 may be provided to supply light to the display panel 20 (see FIG. 2 for example).

The light source apparatus 100 may not include a reflective sheet. That is, a reflective sheet may not be attached to the light source module 110. A further detailed description of this is provided herein below.

The light source module 110 may include the light source 111 provided to emit light. The light source module 110 may include a substrate 112 provided to support and fix the light source 111.

A plurality of the light sources 111 may be provided. The plurality of light sources 111 may be arranged in a predetermined pattern so that light is emitted with uniform brightness. The plurality of light sources 111 may be arranged such that distances between one light source and light sources adjacent thereto are substantially the same.

For example, as illustrated in FIG. 4, the plurality of light sources 111 may be arranged to be aligned in rows and columns. Accordingly, the plurality of light sources may be arranged to substantially form a square by the four light sources adjacent to each other. Also, any one of the light sources may be disposed adjacent to four light sources, and distances between the one light source and the four light sources adjacent thereto may be substantially the same.

As another example, the plurality of light sources 111 may be arranged in a plurality of rows, and a light source belonging to each row may be disposed at a center of two light sources belonging to adjacent rows. Accordingly, the plurality of light sources may be arranged such that a substantially equilateral triangle is formed by three adjacent light sources. In this case, one light source is disposed adjacent to six light sources, and distances between the one light source and the six light sources adjacent thereto may be substantially the same.

However, a pattern in which the plurality of light sources 111 is arranged is not limited to the pattern described above. The plurality of light sources 111 may be arranged in various patterns so that light is emitted with uniform brightness.

The light source 111 may employ a device capable of emitting monochromatic light (light of a specific wavelength, e.g., blue light) or white light (e.g., light in which red light, green light, and blue light are mixed) in various directions when power is supplied. For example, the light source 111 may include a light emitting diode (LED).

The substrate 112 may fix the light source 111 such that a position of the light source 111 is not changed. The substrate 112 may supply power to the light source 111. The light source 111 may receive power from the substrate 112 to emit light.

The substrate 112 may be composed of synthetic resin or tempered glass or a printed circuit board (PCB) on which a conductive power supply line for supporting and fixing the light source 111 and supplying power to the light source 111 is formed.

Light emitted from the light source 111 may pass through various objects such as the diffusion plate 120 and the optical sheet 130. When the light emitted from the light source 111 passes through the diffusion plate 120 and the optical sheet 130, a part of the incident light may be reflected on surfaces of the diffusion plate 120 and the optical sheet 130. The light reflected by the diffuser plate 120 and the optical sheet 130 may be reflected by the substrate 112.

The diffusion plate 120 may be provided in front of the light source module 110. The diffusion plate 120 may uniformly disperse the light emitted from the light source 111 of the light source module 110.

As described above, the plurality of light sources 111 may be provided in various places of the substrate 112. The plurality of light sources 111 is arranged at equal intervals on the substrate 112, but non-uniform brightness may occur depending on the positions of the plurality of light sources 111.

The diffusion plate 120 may diffuse light emitted from the plurality of light sources 111 in order to remove non-uniformity in brightness caused by the plurality of light sources 111. In other words, the diffusion plate 120 may uniformly emit non-uniform light from the plurality of light sources 111 forward.

The optical sheet 130 may include various sheets for improving brightness and uniformity of brightness. For example, the optical sheet 130 may include a diffusion sheet 131, a first prism sheet 132, a second prism sheet 133, a reflective polarizing sheet 134, and the like.

The diffusion sheet 131 may diffuse light for uniformity of brightness. Light emitted from the light source 111 may be diffused by the diffusion plate 120 and diffused again by the diffusion sheet 131 included in the optical sheet 130.

The first prism sheet 132 and the second prism sheet 133 may increase brightness by condensing the light diffused by the diffusion sheet 131. The first prism sheet 132 and the second prism sheet 133 may include triangular prism-shaped prism patterns, and a plurality of the prism patterns may be adjacently arranged to form a plurality of band shapes.

The reflective polarizing sheet 134, which is a type of polarizing film, may transmit one part of incident light and reflect the other part in order to improve brightness. For example, polarized light in the same direction as a predetermined polarization direction of the reflective polarizing sheet 134 may be transmitted, and polarized light in a direction different from the polarization direction of the reflective polarizing sheet 134 may be reflected. In addition, light reflected by the reflective polarizing sheet 134 may be recycled inside the light source apparatus 100, and the brightness of the display apparatus 10 may be improved by such light recycling.

The optical sheet 130 is not limited to the sheets or films illustrated in FIG. 4 and may include more various sheets or films such as a protective sheet.

Figure 5:
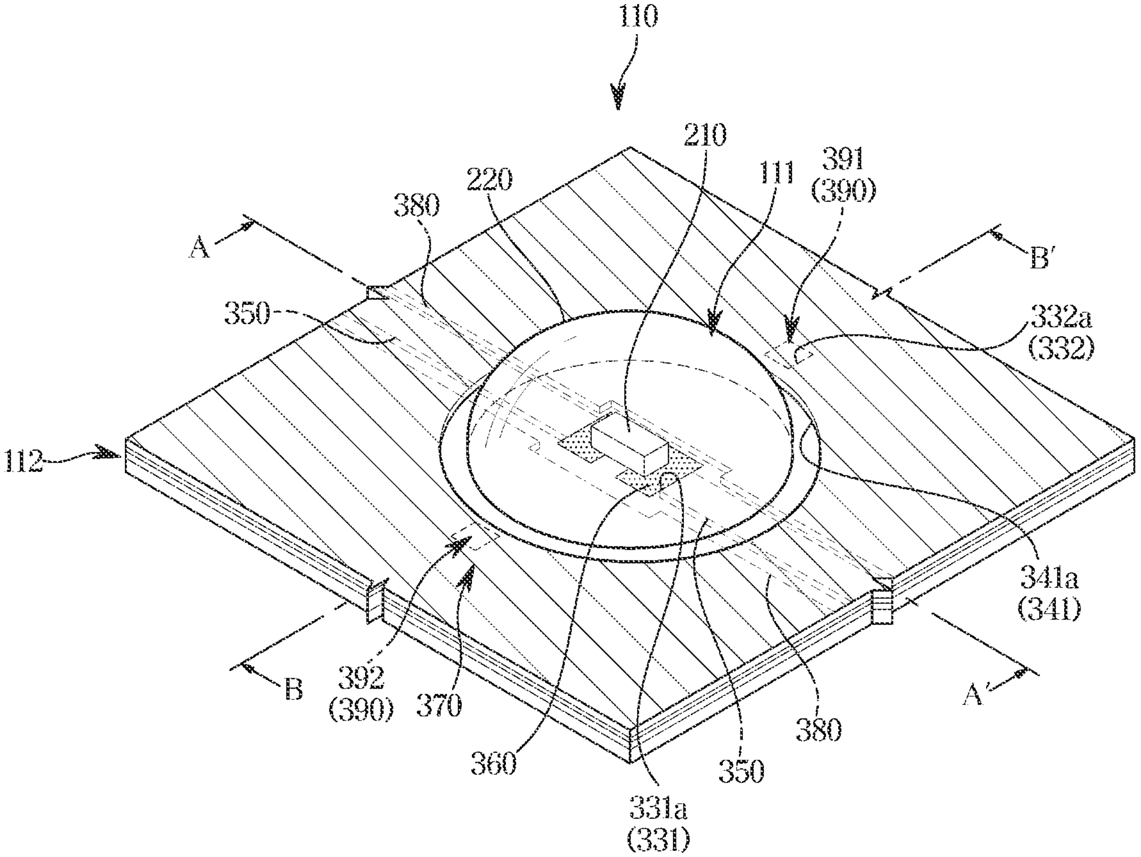
FIG. 5 is a perspective view of a light source module according to an embodiment.
Figure 6:
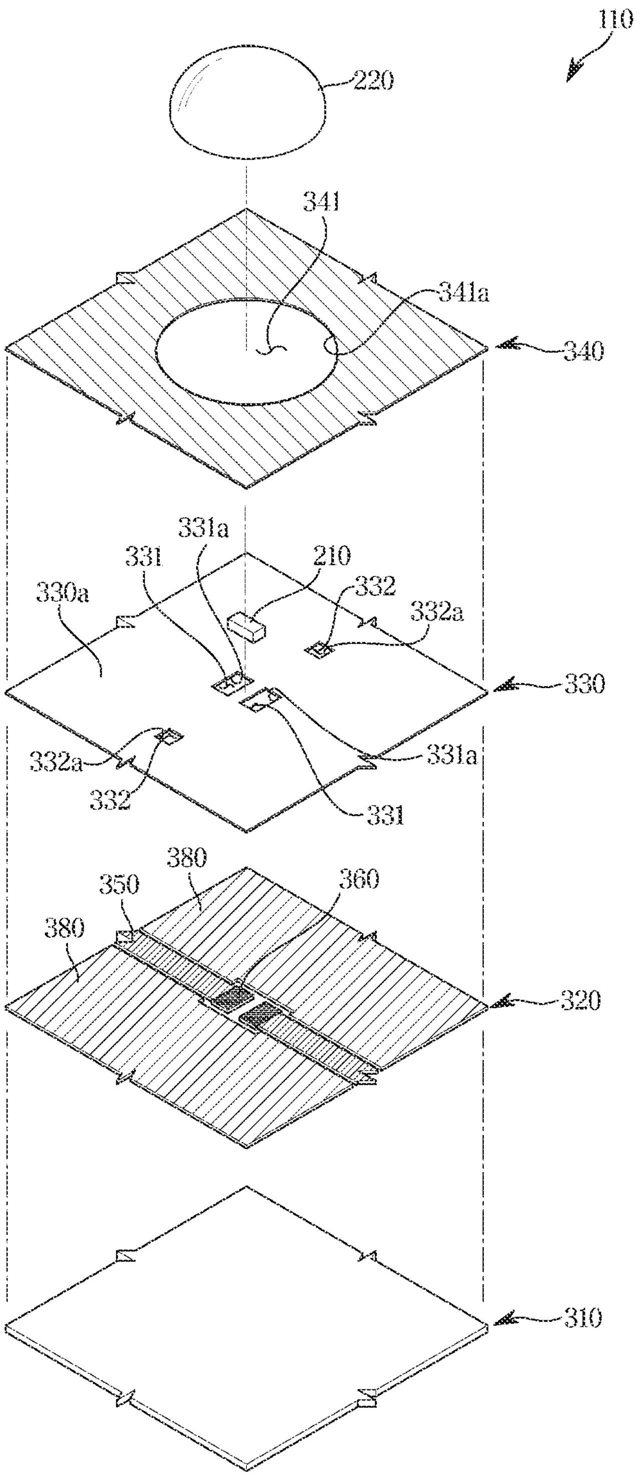
FIG. 6 is an exploded perspective view of the light source module illustrated in FIG. 5.
Figure 7:
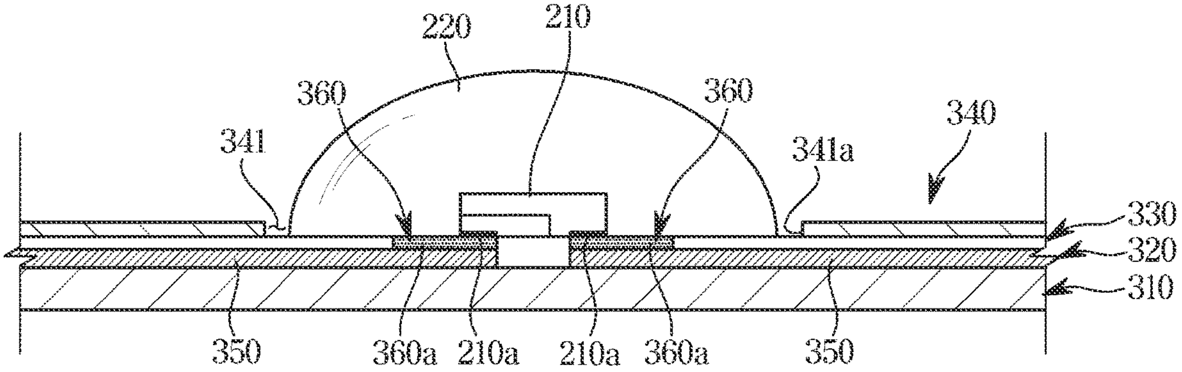
FIG. 7 is a cross-sectional view taken along a direction A-A' illustrated in FIG. 5.
Figure 8:
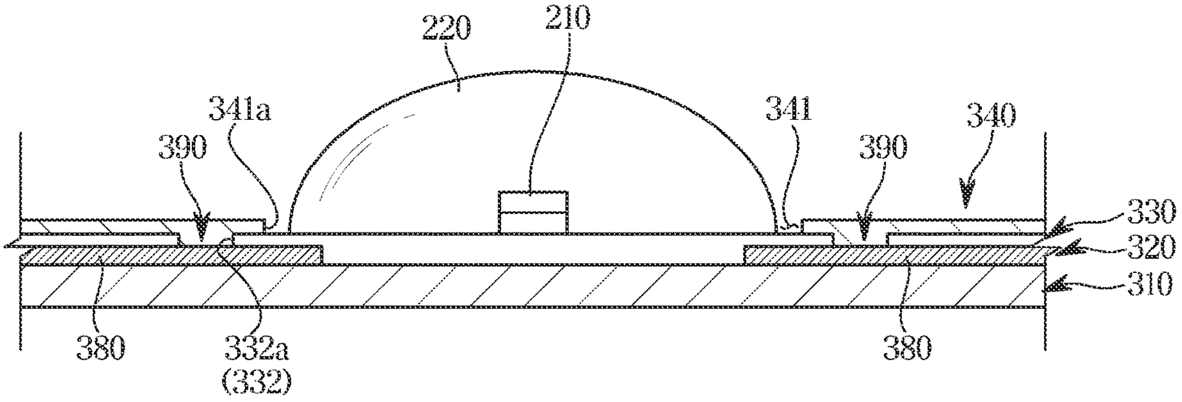
FIG. 8 is a cross-sectional view taken along a direction B-B' illustrated in FIG. 5.
Figure 9:
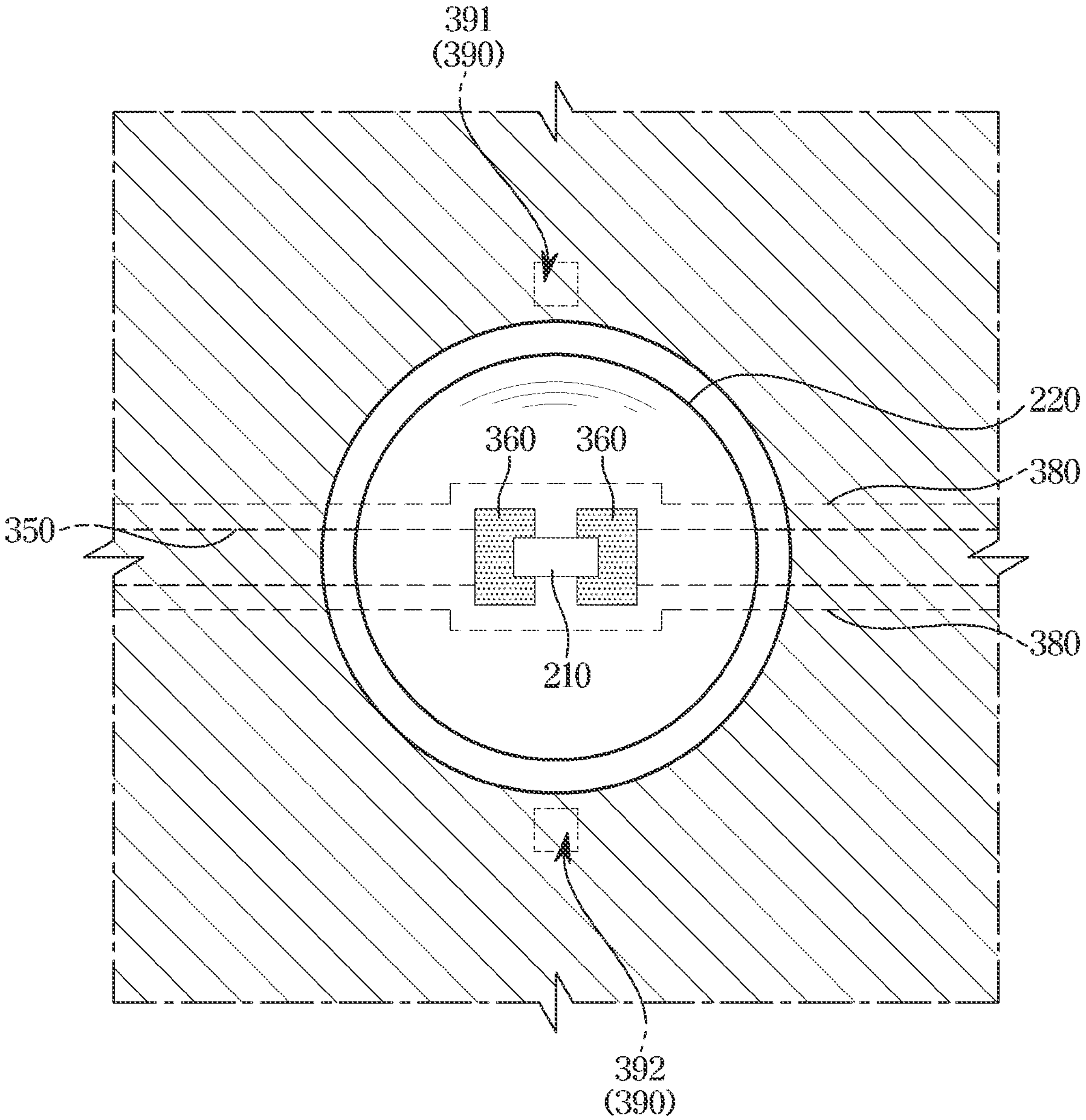
FIG. 9 is a plan view of the light source module according to an embodiment.

FIG. 5 is a perspective view of a light source module according to an embodiment. FIG. 6 is an exploded perspective view of the light source module illustrated in FIG. 5. FIG. 7 is a cross-sectional view taken along a direction A-A' illustrated in FIG. 5. FIG. 8 is a cross-sectional view taken along a direction B-B' illustrated in FIG. 5. FIG. 9 is a plan view of the light source module according to an embodiment.

The light source module 110 may include the light source 111. The light source 111 may include a light emitting diode 210. The light source 111 may include an optical dome 220. Each of the plurality of light sources 111 may include the light emitting diode 210 and the optical dome 220.

In order to improve the uniformity of surface light emitted by the light source apparatus 100 and improve a contrast ratio by local dimming, the number of light sources 111 may increase. Accordingly, a region that may be occupied by each of the plurality of light sources 111 may be narrowed.

For example, in order to reduce an area of the region occupied by each of the plurality of light sources 111, an antistatic circuit (e.g., a Zener diode) for preventing or suppressing damage to the light emitting diode 210 due to electrostatic discharge may be omitted from the light source 111. In other words, the light source 111 may not include a Zener diode connected in parallel with the light emitting diode 210.

The light emitting diode 210 may include a P-type semiconductor and an N-type semiconductor for emitting light by recombination of holes and electrons. A pair of electrodes 210*a* may be provided in the light emitting diode 210 to supply holes and electrons to the P-type semiconductor and the N-type semiconductor, respectively.

The light emitting diode 210 may convert electrical energy into light energy. In other words, the light emitting diode 210 may emit light having maximum intensity at a predetermined wavelength to which power is supplied. For example, the light emitting diode 210 may emit blue light having a peak value at a wavelength representing blue (e.g., a wavelength between 450 nm and 495 nm).

For example, the light emitting diode 210 may be directly attached to the substrate 112 in a chip-on-board (COB) manner. In other words, the light source 111 may include the light emitting diode 210 in which a light emitting diode chip or light emitting diode die is directly attached to the substrate 112 without separate packaging.

For example, in order to reduce the region occupied by the light emitting diode 210, the light emitting diode 210 may be manufactured as a flip chip type that does not include the Zener diode. In the flip chip type light emitting diode 210, when the light emitting diode, which is a semiconductor element, is attached to the substrate 112, an electrode pattern of the semiconductor element may be fused to the substrate 112 as it is without using an intermediate medium such as a metal lead (wire) and a ball grid array (BGA).

As such, as the metal lead (wire) or the ball grid array is omitted, the light source 111 including the flip chip type light emitting diode 210 may be miniaturized. In order to miniaturize the light source 111, the light source module 110 may be manufactured by attaching the flip chip type light emitting diode 210 to the substrate 112 in the chip-on-board manner.

The optical dome 220 may cover the light emitting diode 210. The optical dome 220 may be provided to protect the light emitting diode 210. The optical dome 220 may prevent or suppress damage to the light emitting diode 210 due to an external mechanical action and/or damage to the light emitting diode 210 due to a chemical action.

For example, the optical dome 220 may have a dome shape formed by cutting a sphere into a plane not including a center thereof or a hemispherical shape formed by cutting a sphere into a plane including the center thereof. For example, a vertical cross-section of the optical dome 220 may be arcuate or semicircular.

For example, the optical dome 220 may be made of silicone or epoxy resin. The molten silicon or epoxy resin may be ejected (or applied) onto the light emitting diode 210 through a nozzle N (see FIG. 15 for example) or the like. The optical dome 220 may be formed by curing the silicone or epoxy resin ejected (or applied) onto the light emitting diode 210.

The shape of the optical dome 220 may vary depending on a viscosity of liquid silicone or epoxy resin. For example, the optical dome 220 may be manufactured using silicon having a thixotropic index of about 2.7 to 3.3 (e.g., 3.0). For example, a dome ratio represents the ratio of a height of the dome to a diameter of a base of the dome (height of the dome/diameter of the base), and the dome ratio of the optical dome 220 may be about 2.5 to 3.1 (e.g., 2.8).

The optical dome 220 may be optically transparent or translucent. Light emitted from the light emitting diode 210 may pass through the optical dome 220 to be emitted to the outside.

At this time, the dome-shaped optical dome 220 may refract light like a lens. For example, light emitted from the light emitting diode 210 may be dispersed by being refracted by the optical dome 220.

As such, the optical dome 220 may not only protect the light emitting diode 210 from external mechanical action, chemical action, and/or electrical action, but also may disperse light emitted from the light emitting diode 210.

The light source module 110 may include the substrate 112. The substrate 112 may be provided to support the light source 111. The substrate 112 may be provided to fix the light source 111.

The substrate 112 may be provided to provide an electrical signal and/or power to the light source 111. The substrate 112 may be provided to supply an electrical signal and/or power to the light emitting diode 210. The substrate 112 may be electrically connected to the control assembly 50. The substrate 112 may be electrically connected to the power assembly 60.

The substrate 112 may include a non-conductive insulation layer 310. The substrate 112 may include a conduction layer 320 that is conductive. The substrate 112 may include a plurality of protective layers 330 and 340. The substrate 112 may include the at least two protective layers 330 and 340.

The insulation layer 310 may insulate between lines or patterns of the conduction layer 320. The insulation layer 310 may include a dielectric material for electrical insulation. For example, the insulation layer 310 may be composed of an FR-4 core.

The insulation layer 310 may be provided to support the conduction layer 320.

Lines or patterns through which power and/or electrical signals pass may be formed on the conduction layer 320. The conduction layer 320 may be made of various materials having electrical conductivity. For example, the conduction layer 320 may be made of various metal materials such as copper (Cu), tin (Sn), aluminum (Al), and an alloy thereof. For example, the conduction layer 320 may be electrically connected to the light source 111. For example, the conduction layer 320 may be electrically connected to the light emitting diode 210.

The substrate 112 may include a power feeding line 350. The substrate 112 may include a power feeding pad 360. The power feeding line 350 and the power feeding pad 360 may be provided to supply power to the light emitting diode 210. The light emitting diode 210 may receive power from the power feeding line 350 and the power feeding pad 360 to emit light. For example, a pair of the power feeding pads 360 respectively corresponding to the pair of electrodes **210*a* included in the light emitting diode 210** may be provided.

For example, the power feeding line 350 may be implemented by a line or pattern formed on the conduction layer 320.

For example, the power feeding line 350 may be electrically connected to the light emitting diode 210 through the power feeding pad 360.

For example, the power feeding pad 360 may be formed by exposing the power feeding line 350 to the outside.

For example, a conductive adhesive material **360*a* may be applied onto the power feeding pad 360. The conductive adhesive material 360*a* may be provided to electrically contact the electrode 210*a* of the light emitting diode 210 and the power feeding line 350 exposed to the outside. For example, the conductive adhesive material 360*a* may be provided as one element of the power feeding pad 360**.

The electrode **210*a* of the light emitting diode 210 may be in contact with the conductive adhesive material 360*a*. The light emitting diode 210 may be electrically connected to the power feeding line 350 through the conductive adhesive material 360*a***.

For example, the conductive adhesive material **360*a* may include electrically conductive solder. For example, the conductive adhesive material 360*a* may include electrically conductive epoxy adhesives. However, the present disclosure is not limited thereto, and the conductive adhesive material 360***a* may include various materials for electrical connection between the light emitting diode 210 and the power feeding line 350.

The substrate 112 may include an antistatic member 370. The antistatic member 370 may be provided to protect the light emitting diode 210 from electrostatic discharge. The antistatic member 370 may absorb an electric impact due to electrostatic discharge generated near the optical dome 220.

As described above, the optical dome 220 may protect the light emitting diode 210 from an external electrical action. Charges generated by electrostatic discharge do not pass through the optical dome 220 and may flow along an outer surface of the optical dome 220. The charges flowing along the outer surface of the optical dome 220 may reach the light emitting diode 210 along a boundary between the optical dome 220 and the substrate 112. The light emitting diode 210 may be damaged due to an electric shock caused by the charges penetrating along the boundary between the optical dome 220 and the substrate 112. The antistatic member 370 may be provided near the optical dome 220 to prevent or suppress such a flow of charges, that is, current.

The antistatic member 370 may include an antistatic line 380. The antistatic member 370 may include an antistatic pad 390.

The antistatic line 380 may provide a path for current due to electrostatic discharge generated near the optical dome 220. In other words, the antistatic line 380 may guide charges generated by electrostatic discharge to flow to a ground. For example, the antistatic line 380 may be made of the same material as the power feeding line 350. For example, the antistatic line 380 may be made of various metal materials such as copper (Cu), tin (Sn), aluminum (Al), and an alloy thereof. However, the present disclosure is not limited thereto, and the antistatic line 380 may be made of a material different from that of the power feeding line 350.

The antistatic pad 390 may be provided to protect the light emitting diode 210 from electrostatic discharge. The antistatic pad 390 may prevent or suppress current generated by electrostatic discharge from flowing to the power feeding line 350. The antistatic pad 390 may prevent or suppress charges generated by electrostatic discharge from reaching the power feeding pad 360. The antistatic pad 390 may prevent or suppress current generated by electrostatic discharge from flowing to the light emitting diode 210 along the boundary between the optical dome 220 and the substrate 112. The antistatic pad 390 may be provided to capture charges generated by electrostatic discharge. The charges captured by the antistatic pad 390 may flow to the ground. Accordingly, tolerance of the light source module 110 to electrostatic discharge may be improved.

The antistatic pad 390 may be provided separately from the power feeding pad 360 in contact with the light emitting diode 210. The antistatic pad 390 may not be in contact with the light emitting diode 210. The antistatic pad 390 may be disposed relatively closer to the optical dome 220 than to other elements illustrated in FIG. 5 for example.

For example, the antistatic line 380 may be implemented by a line or pattern formed on the conduction layer 320.

For example, the antistatic pad 390 may be formed by exposing the antistatic line 380 to the outside.

For example, the shortest distance from an outer line of the optical dome 220 to the antistatic pad 390 may be shorter than the shortest distance from the outer line of the optical dome 220 to the power feeding pad 360. For example, the shortest distance from the outer line of the optical dome 220 to the antistatic pad 390 may be shorter than a radius of the optical dome 220.

For example, a plurality of the antistatic pad 390 may be provided. For example, the antistatic pad 390 may include a first antistatic pad 391 and a second antistatic pad 392.

However, the present disclosure is not necessarily limited to those features, and three or more of the antistatic pad 390 may be provided, and only one of the antistatic pad 390 may also be provided. The antistatic pad 390 may include various shapes such as a circular shape, a polygonal shape, and a band shape.

For example, the optical dome 220 may be provided between the first antistatic pad 391 and the second antistatic pad 392. For example, the first antistatic pad 391 and the second antistatic pad 392 may be disposed on opposite sides of the optical dome 220. The plurality of the antistatic pad 390 may be provided to surround the optical dome 220. However, the present disclosure is not limited thereto, and any arrangement of the antistatic pad 390 is possible as long as the antistatic pad 390, singular or plural, is disposed to prevent or suppress current generated by electrostatic discharge from flowing to the power feeding line 350 or the light emitting diode 210.

The conduction layer 320 may be formed on the insulation layer 310.

Although the drawing illustrates that the one conduction layer 320 is formed on the one insulation layer 310, the present disclosure is not limited thereto. For example, the insulation layer 310 and the conduction layer 320 may be alternately formed. For example, a plurality of the insulation layers 310 and/or conduction layers 320 may be provided. For example, one insulation layer may be disposed between two conduction layers. For example, the conduction layer 320 is provided as the first conduction layer 320, and the substrate 112 may further include a second conduction layer provided to support the insulation layer 310. However, the present disclosure is not limited to the above examples, and the substrate 112 may be formed by various arrangement combinations of the insulation layer 310 and the conduction layer 320.

The substrate 112 may include the first protective layer 330. The first protective layer 330 may be provided to prevent or suppress damage to the substrate 112 due to an external impact. The first protective layer 330 may be provided to prevent or suppress damage to the substrate 112 due to chemical action (e.g., corrosion). The first protective layer 330 may be provided to prevent or suppress at least one of damages to the substrate 112 due to optical action.

For example, the first protective layer 330 may include photo solder resist (PSR), and the first protective layer 330 may be referred to as the first PSR layer 330. For example, the first protective layer 330 may be formed by a PSR process.

The first protective layer 330 may be provided to be formed on the conduction layer 320. The first protective layer 330 may be provided to cover a portion of the conduction layer 320. The first protective layer 330 may be provided to expose a portion of the conduction layer 320. The first protective layer 330 may be provided to cover a portion of the power feeding line 350. The first protective layer 330 may be provided to expose a portion of the power feeding line 350. The first protective layer 330 may be provided to cover a portion of the antistatic line 380. The first protective layer 330 may be provided to expose a portion of the antistatic line 380.

The first protective layer 330 may include a first exposed portion 331. The first exposed portion 331 may be provided to expose a portion of the conduction layer 320 to connect the conduction layer 320 and the light emitting diode 210. The conduction layer 320 and the light emitting diode 210 may electrically contact each other through the first exposed portion 331.

The first protective layer 330 may be provided to form the power feeding pad 360. For example, a portion of the power feeding line 350 exposed to the outside by the first exposed portion 331 of the first protective layer 330 may form the power feeding pad 360. For example, the conductive adhesive material 360*a* may be applied onto the first exposed portion 331 of the first protective layer 330. For example, the conductive adhesive material 360*a* applied onto the first exposed portion 331 may be formed as a portion of the power feeding pad 360.

For example, the first exposed portion 331 may be formed by removing a portion of the first protective layer 330. For example, the first protective layer 330 may be formed as PSR ink is applied or coated onto the insulation layer 310, and the first exposed portion 331 may be formed by removing an uncured portion of the PSR ink applied or coated onto the insulation layer 310.

For example, an edge 331*a* of the first exposed portion 331 may be provided to define a region of the power feeding pad 360. For example, the edge 331*a* of the first exposed portion 331 may be provided to define a region onto which the conductive adhesive material 360*a* is applied.

The first exposed portion 331 may be referred to as the first window 331.

The optical dome 220 may be disposed on the first protective layer 330. The optical dome 220 may be disposed on the first protective layer 330 to cover the light emitting diode 210. The optical dome 220 may be disposed on one surface 330*a* of the first protective layer 330 to cover the light emitting diode 210 connected to the conduction layer 320 through the first exposed portion 331. The optical dome 220 may be disposed on one side of the first protective layer 330 facing the second protective layer 340.

The first protective layer 330 may include a second exposed portion 332. The second exposed portion 332 may be formed to be spaced apart from the first exposed portion 331. The second exposed portion 332 may be provided to expose a portion of the conduction layer 320. The conduction layer 320 exposed by the second exposed portion 332 may be provided to capture charges generated by electrostatic discharge.

The first protective layer 330 may be provided to form the antistatic pad 390. For example, a portion of the antistatic line 380 exposed to the outside by the second exposed portion 332 of the first protective layer 330 may form the antistatic pad 390. For example, an antistatic pad 390 may be provided around the optical dome 220 to protect the light emitting diode 210 from electrostatic discharge.

For example, the first exposed portion 331 may be formed by removing a portion of the first protective layer 330. For example, the first protective layer 330 may be formed as the PSR ink is applied or coated onto the insulation layer 310, and the second exposed portion 332 may be formed by removing an uncured portion of the PSR ink applied or coated onto the insulation layer 310.

For example, an edge 332*a* of the second exposed portion 332 may be provided to define a region of the antistatic pad 390.

The second exposed portion 332 may be referred to as the second window 332.

The substrate 112 may include the second protection layer 340. The second protective layer 340 may be provided to prevent or suppress damage to the substrate 112 due to an external impact. The second protective layer 340 may be provided to prevent or suppress damage to the substrate 112 due to chemical action (e.g., corrosion). The second protective layer 340 may be provided to prevent or suppress at least one of damages to the substrate 112 due to optical action. For example, the second protective layer 340 may be disposed on an outermost side of the substrate 112. For example, as the second protective layer 340 is formed on the first protective layer 330, reflectance of the substrate 112 may increase, and thus the reflective sheet may be omitted. A detailed description of this will be given later.

For example, the second protective layer 340 may include photo solder resist (PSR), and the second protective layer 340 may be referred to as the second PSR layer 340. For example, the second protective layer 340 may be formed by the PSR process. For example, the second protective layer 340 may be formed by locally printing the PSR ink on the first protective layer 330.

The second protective layer 340 may be provided to be formed on the first protective layer 330. The second protective layer 340 may be provided to cover a portion of the first protective layer 330. The second protective layer 340 may be provided to expose a portion of the first protective layer 330. The second protective layer 340 may be provided to cover the antistatic pad 390. The second protective layer 340 may be provided to expose the power feeding pad 360.

For example, a region in which the second protective layer 340 covers the first protective layer 330 may be different from a region in which the first protective layer 330 covers the conduction layer 320. For example, a region in which the second protective layer 340 exposes the first protective layer 330 may be different from a region in which the first protective layer 330 exposes the conduction layer 320.

The second protective layer 340 may include a third exposed portion 341.

The third exposed portion 341 may be provided to expose a portion of the first protective layer 330. The third exposed portion 341 may be provided to form a region for disposing the optical dome 220 on the first protective layer 330.

The third exposed portion 341 may be provided to correspond to the first exposed portion 331. The third exposed portion 341 may be provided to expose the first exposed portion 331. The third exposed portion 341 may be provided to expose the first exposed portion 331 in a direction toward the light source 111 of the substrate 112.

The third exposed portion 341 may be provided to correspond to the power feeding pad 360. The third exposed portion 341 may be provided to expose the power feeding pad 360. The third exposed portion 341 may be provided to expose the power feeding pad 360 in the direction toward the light source 111 of the substrate 112.

For example, the light emitting diode 210 connected to the conduction layer 320 through the first exposed portion 331 may be exposed to the outside through the third exposed portion 341. The optical dome 210 may be disposed on the first protective layer 330 to cover the light emitting diodes 210 exposed through the third exposed portion 341. Accordingly, the third exposed portion 341 may form the region for disposing the optical dome 220 on the first protective layer 330.

For example, the third exposed portion 341 may be provided not to correspond to the antistatic pad 390. Accordingly, the antistatic pad 390 may not be exposed by the third exposed portion 341. The second protective layer 340 may be provided to cover the antistatic pad 390.

For example, the third exposed portion 341 may be formed by removing a portion of the second protective layer 340. For example, the second protective layer 340 may be formed as the PSR ink is applied or coated onto the first protective layer 330, and the third exposed portion 341 may be formed by removing an uncured portion of the PSR ink applied or coated onto the first protective layer 330.

For example, an edge 341*a* of the third exposed portion 341 may be provided to define the region for disposing the optical dome 220 on the first protective layer 330.

For example, the edge 341*a* of the third exposed portion 341 may be spaced apart from the optical dome 220. For example, the edge 341*a* of the third exposed portion 341 may be provided to surround the optical dome 220.

For example, the edge 341*a* of the third exposed portion 341 may be provided to form a step with the one surface 330*a* of the first protective layer 330. For example, a height of the edge 341*a* of the third exposed portion 341 may be substantially the same as a thickness of the second protective layer 340.

For example, the optical dome 220 may be positioned in a region formed by the third exposed portion 341. For example, a size of the third exposed portion 341 may be larger than that of the optical dome 220. For example, the third exposed portion 341 may have a circular shape, and a diameter of the third exposed portion 341 may be larger than a maximum diameter of the optical dome 220.

For example, a center of the third exposed portion 341 may be substantially coincident with a center of the optical dome 220.

For example, the first exposed portion 331 may be provided to be positioned in the region formed by the third exposed portion 341. For example, the light emitting diode 210 connected to the conduction layer 320 through the first exposed portion 331 may be positioned in the region formed by the third exposed portion 341.

The third exposed portion 341 may be referred to as the third window 341.

On the other hand, the configuration of the first protective layer 330 and the second protective layer 340 is not limited by ordinal numbers of "first" and "second". For example they may be referred to as the first protective layer 340 and the second protective layer 330, respectively.

The configuration of the first exposed portion 331, the second exposed portion 332, and the third exposed portion 341 is not limited by ordinal numbers of "first", "second", and "third". For example, they may be referred to as the first exposed portion 331, the third exposed portion 332, and the second exposed portion 341, respectively. For example, they may be referred to as the third exposed portion 331, the second exposed portion 332, and the first exposed portion 341, respectively. For example, they may be referred to as the second exposed part 331, the third exposed part 332, and the first exposed part 341, respectively. The present disclosure is not limited to the above examples, and the first exposed portion 331, the second exposed portion 332, and the third exposed portion 341 may be referred to variously. The first window 331, the second window 332, and the third window 341 may also referred to variously without being limited to ordinal numbers.

In contrast to the related art described in the background above where a large amount of static electricity may be generated when the reflective sheet is detached from a base film having an adhesive surface, and the light source module may be damaged by static electricity, according to the present disclosure, the light source apparatus 100 may have a structure that does not include a reflective sheet. By providing the plurality of protective layers 330 and 340, the light source apparatus 100 may secure equal or higher light brightness performance and/or Mura performance compared to the conventional light source apparatus without a reflective sheet. Although the drawings illustrate that the light source apparatus 100 includes the first protective layer 330 and the second protective layer 340, embodiments of this disclosure are not limited thereto. For example, the light source apparatus 100 may include a third protective layer 340 formed on the second protective layer 340. For example, some of the plurality of protective layers may be provided to have a first cover region, and the rests of the plurality of protective layers may be provided to be formed on the some of the plurality of protective layers to have a second cover region. The light source apparatus 100 may secure a predetermined reflectance by including the second protective layer 340 formed on the first protective layer 330.

According to the present disclosure, the light source apparatus 100 may have a structure in which the reflective sheet is omitted. Accordingly, the process of attaching the reflective sheet may be omitted, and a material cost of the reflective sheet may be reduced. Also, generation of static electricity by the reflective sheet may be prevented.

As a thickness of the protective layer increases, the reflectance increases, but when the thickness exceeds a certain thickness, the reflectance has a limit. In addition, when the thickness of the protective layer is too thick, uniformity of the protective layer may be reduced or it may be difficult to form a region for mounting the light source on the protective layer. When the thickness of the protective layer is too thick, defects may occur when the substrate is manufactured. For example, when the thickness of the protective layer is too thick, an undercut phenomenon in which a developer permeates a lower side of the protective layer in a developing process may occur.

For example, the second protective layer 340 may have the thickness ranging from 20 μm to 50 μm. The second protective layer 340 may have the thickness smaller than that of a conventional reflective sheet (having a thickness of 150 μm). For example, the second protective layer 340 may secure maximum reflectance for reducing optical loss by having the thickness of about 20 μm or more. For example, the second protective layer 340 may have the thickness of about 50 μm or less, thereby ensuring the uniformity of the protective layer and facilitating formation of the third exposed portion 341. For example, the second protective layer 340 may have the thickness of about 50 μm or less, thereby reducing or suppressing defects (e.g., the undercut phenomenon) when the light source module 110 is manufactured.

As an open region (exposed portion) of the protective layer decreases, a reflection area increases, and thus optical efficiency of the light source apparatus may be increased. That is, as the open region (exposed portion) of the protective layer decreases, the protective layer may effectively reflect light emitted from the light source, light emitted from the light source and reflected by the diffusion plate (or optical sheet), and the like. However, when the open region (exposed portion) of the protective layer is too narrow, it may be difficult to manufacture the substrate. For example, as the open region (exposed portion) of the protective layer decreases, a region for disposing the light source 111 on the substrate 112 may be tight.

For example, the third exposed portion 341 of the second protective layer 340 may have a diameter ranging from about 2 mm to about 4 mm. The third exposed portion 341 of the second protective layer 340 may be smaller than a passing hole of the conventional reflective sheet. A range of the first protective layer 330 exposed by the third exposed portion 341 of the second protective layer 340 may be smaller than a range of the substrate exposed by the passing hole of the reflective sheet. A reflective area of the second protective layer 340 may be larger than that of the conventional reflective sheet. For example, the third exposed portion 341 may have the diameter of about 2 mm or more to reduce or suppress defects (e.g., incorrectly attaching the light source 111 to the substrate 112, etc.) when the light source module 110 is manufactured. For example, the third exposed portion 341 may have the diameter of about 2 mm or more to secure a predetermined space for disposing the light source 111 on the substrate 112.

Figure 10:
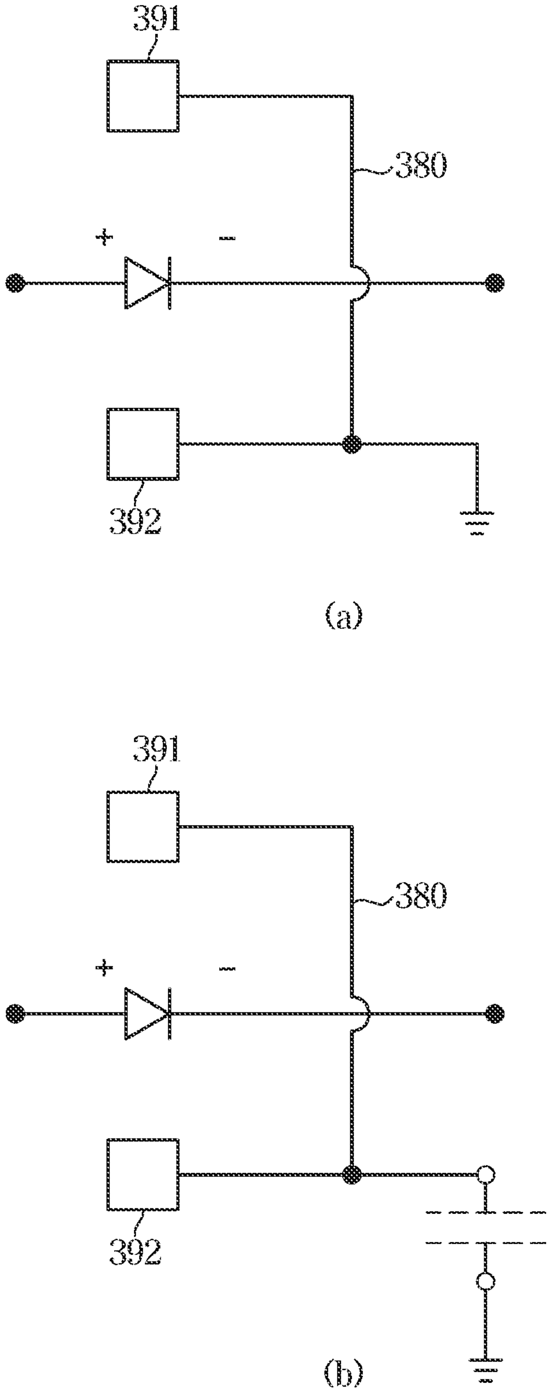
FIG. 10 is an equivalent circuit diagram of the light source module according to an embodiment.

FIG. 10 is an equivalent circuit diagram of the light source module according to an embodiment.

Referring to portion (a) of FIG. 10, the antistatic pad 390 may be connected to the ground through the antistatic line 380. The first antistatic pad 391 and the second antistatic pad 392 may be connected to the ground through the antistatic line 380. Charges captured by the first antistatic pad 391 and the second antistatic pad 392 may flow to the ground along the antistatic line 380. As the light source module 110 includes the antistatic pad 390, tolerance of the light source 111 to electrostatic discharge may be improved.

Referring to portion (b) of FIG. 10, the antistatic line 380 connected to the antistatic pad 390 may not be directly connected to the ground and may be coupled to the ground by a parasitic capacitance. The antistatic line 380 connected to the first antistatic pad 391 and the second antistatic pad 392 may not be directly connected to the ground and may be coupled to the ground by the parasitic capacitance. Charges captured by the first antistatic pad 391 and the second antistatic pad 392 may flow to the ground along the antistatic line 380 by the parasitic capacitance. As the light source module 110 includes the antistatic pad 390, the tolerance of the light source 111 to electrostatic discharge may be improved.

Figure 11:
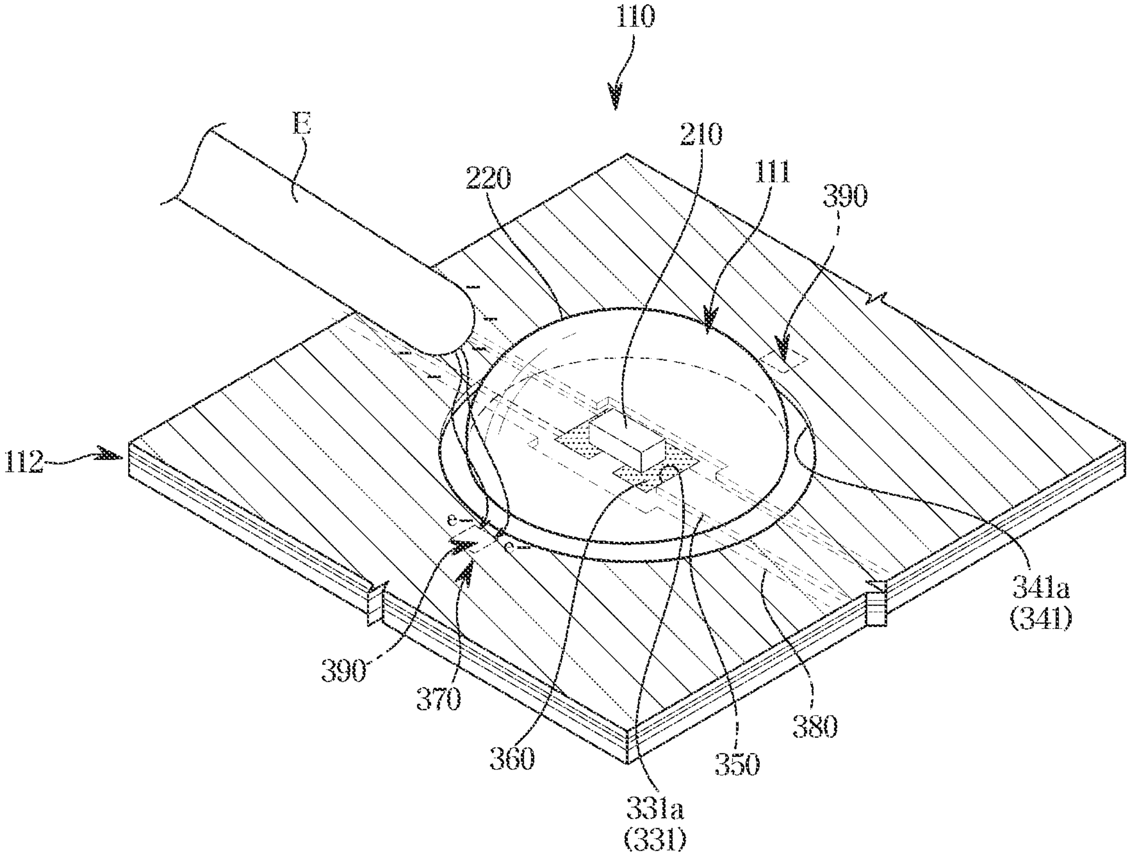
FIG. 11 illustrates an example of electrostatic discharge in the light source module according to an embodiment.

FIG. 11 illustrates an example of electrostatic discharge in the light source module according to an embodiment.

For example, as illustrated in FIG. 11, when a negatively charged electrified body E approaches the light source 111 or comes into contact with the light source 111, negative charges may be released from the electrification body E.

The released negative charges do not pass through the inside of the optical dome 220 made of a non-conductive material and may move along the outer surface of the optical dome 220.

The negative charges moving along the outer surface of the optical dome 220 may move to the antistatic pad 390 along an outer surface of the substrate 112 at the boundary between the optical dome 220 and the substrate 112, or may move to the power feeding pad 360 along the boundary between the optical dome 220 and the substrate 112.

When a distance from the outer surface of the optical dome 220 to the antistatic pad 390 is short, most of the negative charges may move to the antistatic pad 390, and only a small part of the negative charges may move to the power feeding pad 360. In other words, current due to electrostatic discharge may flow to the ground through the antistatic pad 390, and only a very small current may flow to the light emitting diode 210 through the power feeding pad 360.

Accordingly, the tolerance of the light source 111 to electrostatic discharge may be improved. In other words, a voltage due to electrostatic discharge that the light source 111 may withstand may increase.

Figure 12:
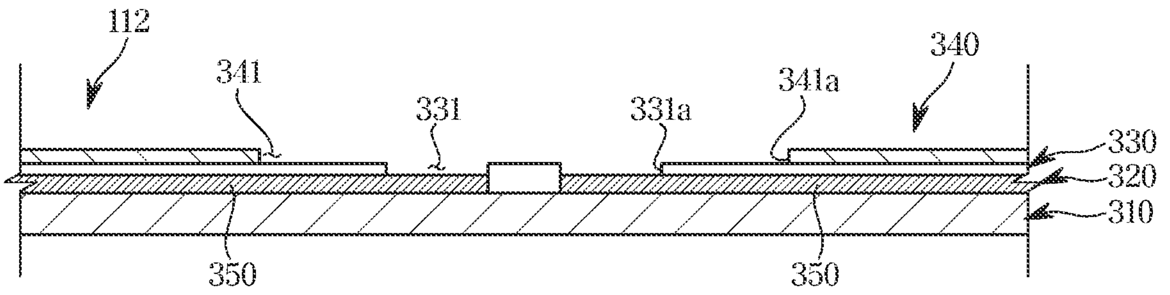
FIG. 12 illustrates a substrate according to an embodiment.
Figure 13:
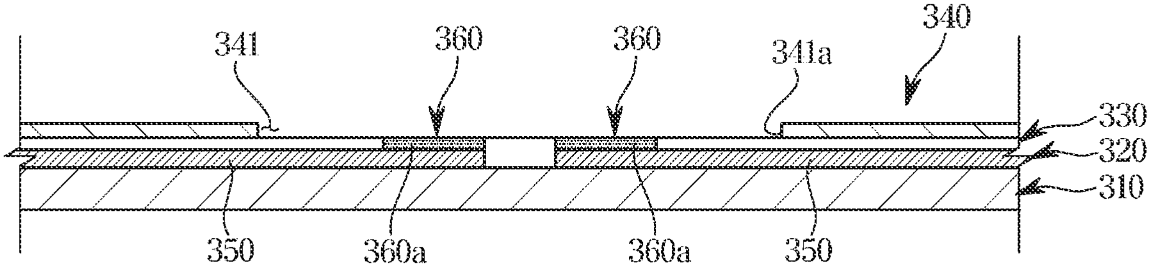
FIG. 13 illustrates a state in which an adhesive material is applied onto the substrate illustrated in FIG. 12.
Figure 14:
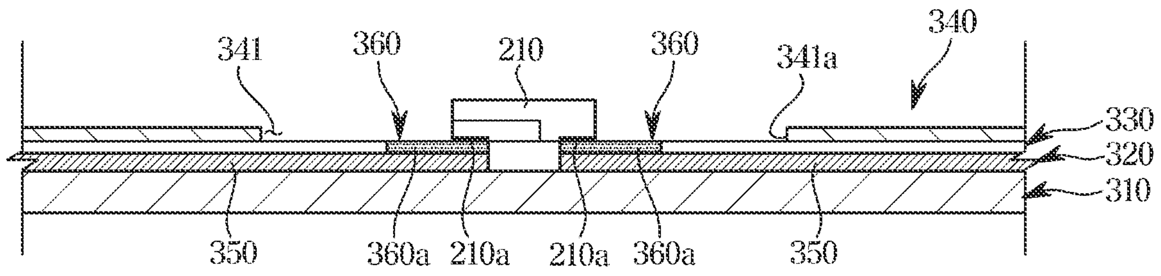
FIG. 14 illustrates a state in which a light emitting diode is mounted on the substrate illustrated in FIG. 13.
Figure 15:
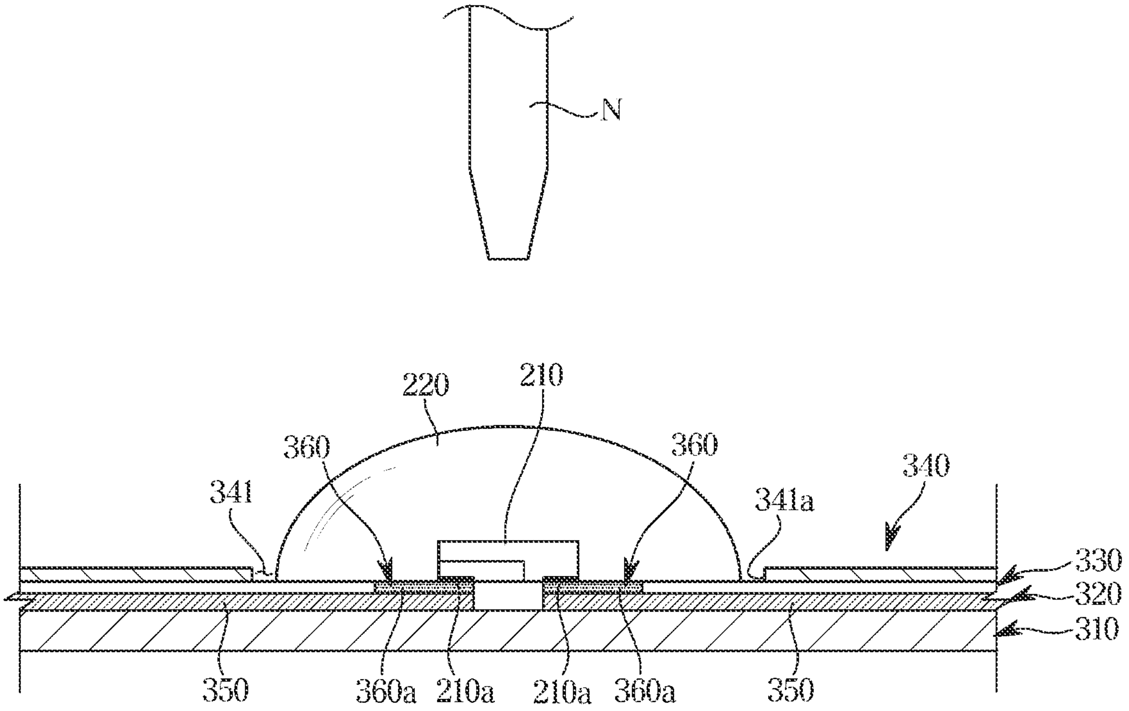
FIG. 15 illustrates a state in which an optical dome is mounted on the substrate illustrated in FIG. 14.

FIG. 12 illustrates a substrate according to an embodiment. FIG. 13 illustrates a state in which an adhesive material is applied onto the substrate illustrated in FIG. 12. FIG. 14 illustrates a state in which a light emitting diode is mounted on the substrate illustrated in FIG. 13. FIG. 15 illustrates a state in which an optical dome is mounted on the substrate illustrated in FIG. 14.

An example of a manufacturing process of the light source module 110 will be described below with reference to FIG. 12, FIG. 13, FIG. 14, and FIG. 15. However, what is illustrated in FIG. 12, FIG. 13, FIG. 14, and FIG. 15 is merely exemplary. The light source module 110 may also be manufactured by various other processes and/or procedures.

Referring to FIG. 12, the substrate 112 on which the light source 111 is mounted may be prepared. For example, the substrate 112 may include the insulation layer 310, the conduction layer 320 formed on the insulation layer 310, the first protective layer 330 formed on the conduction layer 320, and the second protective layer 340 formed on the first protective layer 330. For example, the first protective layer 330 and the second protective layer 340 may be formed by the PSR process. However, this is merely exemplary, and the substrate 112 may be formed by various configurations and/or arrangements.

Referring to FIG. 13, the conductive adhesive material **360*a* may be applied onto the first exposed portion 331 of the first protective layer 330. For example, when the thickness of the protective layer is thick, a height at which the conductive adhesive material 360*a* is applied may increase. For example, when the plurality of protective layers is simply doubly disposed (or triple or more), the height at which the conductive adhesive material 360*a* is applied may be a value obtained by adding the thickness of each of the plurality of protective layers. Accordingly, it may be difficult to apply the conductive adhesive material 360*a* within a desired region range. According to the present disclosure, the first protective layer 330 and the second protective layer 340 are not simply doubly disposed. A cover region of the second protective layer 340 and a cover region of the first protective layer 330 may be different. The third exposed portion 341 of the second protective layer 340 may be provided to open the first exposed portion 331 of the first protective layer 330 to one side. By this structure, the height at which the conductive adhesive material 360*a* is applied may be substantially a thickness of the first protective layer 330. Accordingly, when the conductive adhesive material 360*a*** is applied, a deviation may be reduced.

Referring to FIG. 14, the light emitting diode 210 may be disposed on the substrate 112. The electrode **210*a* of the light emitting diode 210 may be in contact with the conductive adhesive material 360*a*. The light emitting diode 210 may be electrically connected to the power feeding line 350 through the conductive adhesive material 360*a***.

Referring to FIG. 15, the optical dome 220 may be disposed on the substrate 112. The optical dome 220 may be disposed on the first protective layer 330 to cover the light emitting diode 210. The third exposed portion 341 of the second protective layer 340 may be provided to open the light emitting diode 210 connected to the conduction layer 320 through the first exposed portion 331 to one side. Accordingly, the second protective layer 340 may form the region for disposing the optical dome 220. In addition, the edge **341*a* of the third exposed portion 341 may be provided to form the step with the one surface 330*a* of the first protective layer 330. Accordingly, the second protective layer 340 serves as a kind of a locking protrusion, so that the optical dome 220 may be easily disposed on the substrate 112. For example, the second protective layer 340 may reduce or prevent a de-centering phenomenon that may occur in a process in which the optical dome 220 is disposed on the substrate 112. For example, the second protective layer 340 may reduce or prevent a phenomenon in which an aspect ratio of the optical dome 220** is lowered.

For example, molten silicon or epoxy resin may be discharged (or applied) onto the light emitting diode 210 through the nozzle N or the like. The optical dome 220 may be formed by curing the silicone or epoxy resin discharged (or applied) onto the light emitting diode 210.

The light source apparatus according to an embodiment may include the light source 111 including the light emitting diode 210 and the optical dome 220 provided to cover the light emitting diode, and the substrate 112 provided to support the light source. The substrate may include the conduction layer 320 having electrical conductivity, the first protective layer 330 formed on the conduction layer, and the second protective layer 340 formed on the first protective layer. The first protective layer 330 may include the first exposed portion 331 provided to expose a portion of the conduction layer to connect the conduction layer and the light emitting diode. The optical dome may be disposed on the first protective layer 330. The second protective layer 340 may include the second exposed portion 341 provided to form the region for disposing the optical dome on the first protective layer by exposing a portion of the first protective layer. According to the present disclosure, the light source apparatus may have the structure in which the reflective sheet is omitted. According to the present disclosure, the process for attaching the reflective sheet to the substrate may be omitted. According to the present disclosure, as the process of attaching the reflective sheet is omitted, generation of static electricity may also be prevented when the reflective sheet is attached. The light source apparatus may secure light efficiency and/or Mura performance by including the first protective layer and the second protective layer.

The first protective layer may be provided to form the antistatic pad 390 provided around the optical dome to protect the light emitting diode from electrostatic discharge. The second protective layer may be provided to cover the antistatic pad. According to the present disclosure, the light source apparatus may prevent an EOS. According to the present disclosure, the light source apparatus may prevent an EDS.

The first protective layer may further include the third exposed portion 332 provided to be spaced apart from the first exposed portion and form the antistatic pad by exposing a portion of the conduction layer.

The edge 341*a* of the second exposed portion may be provided to be spaced apart from the optical dome and to surround the optical dome.

The optical dome may be provided to be positioned within a region formed by the second exposed portion.

The light emitting diode connected to the first exposed portion and the conduction layer through the first exposed portion may be provided to be positioned within the region formed by the second exposed portion.

The second exposed portion may be provided to expose the first exposed portion in the direction toward the light source of the substrate.

The second exposed portion 341 may have the diameter ranging from 2 mm to 4 mm.

The second protective layer 340 may have the thickness ranging from 20 μm to 50 μm.

The edge 341*a* of the second exposed portion may be provided to form the step with the one surface 330*a* of the first protective layer.

The optical dome may be formed by applying silicon or epoxy resin to the light emitting diode exposed through the second exposed portion.

The first protective layer and the second protective layer may be formed by the PSR process.

A plurality of the antistatic pads 390 may be provided.

The substrate may further include the insulation layer 310 provided to support the conduction layer.

The conduction layer may be a first conduction layer, and the substrate may further include a second conduction layer provided to support the insulation layer.

The display apparatus according to an embodiment may include the display panel 20, and the light source apparatus 100 disposed at a rear of the display panel to supply light to the display panel. The light source apparatus 100 may include the conduction layer 320 having electrical conductivity, the first protective layer 330 formed on the conduction layer, the antistatic pad 390 formed on the first protective layer to capture charges due to electrostatic discharge by exposing a portion of the conduction layer, and the second protective layer 340 formed on the first protective layer to cover the antistatic pad.

The light source apparatus may further include the light emitting diode 210 provided to be connected to the conduction layer, and the optical dome 220 disposed on the one surface 330*a* of the first protective layer to cover the light emitting diode.

The second protective layer may further include the window 341 provided to expose a portion of the first protective layer. The optical dome may be provided to be positioned in a region formed by the window 341 of the second protective layer.

The second protective layer 340 may have the thickness ranging from 20 μm to 50 μm.

The window 341 may have the diameter ranging from 2 mm to 4 mm.

Effects obtainable from the present disclosure are not limited to the effects mentioned above, and other effects not mentioned will be clearly understood by those skilled in the art from the description below.

The foregoing has illustrated and described specific embodiments. However, it should be understood by those of skilled in the art that the present disclosure is not limited to the above-described embodiments, and various changes and modifications may be made without departing from the technical idea of the present disclosure described in the following claims.

What is claimed is:

1. A light source apparatus comprising:
a light source comprising a light emitting diode and an optical dome covering the light emitting diode; and
a substrate supporting the light source,
wherein the substrate comprises:
a conduction layer that is electrically conductive;
a first protective layer disposed on the conduction layer and on which the optical dome is disposed, the first protective layer comprising a first exposed portion exposing a portion of the conduction layer to connect the conduction layer and the light emitting diode; and
a second protective layer disposed on the first protective layer, the second protective layer comprising a second exposed portion exposing a portion of the first protective layer at which the optical dome is disposed on the first protective layer, and wherein an edge of the second exposed portion surrounds an outside of the optical dome, wherein the first protective layer comprises an antistatic pad provided around the optical dome and configured to protect the light emitting diode from electrostatic discharge, wherein the antistatic pad is exposed through an opening of the first protective layer, and wherein the second protective layer covers the antistatic pad and the opening of the first protective layer.

2. The light source apparatus according to claim 1, wherein the first protective layer further comprises a third exposed portion that is spaced apart from the first exposed portion and at which the portion of the conduction layer is exposed at the antistatic pad.

3. The light source apparatus according to claim 1, wherein the edge of the second exposed portion is spaced apart from the optical dome.

4. The light source apparatus according to claim 1, wherein the optical dome is within a region of the second exposed portion.

5. The light source apparatus according to claim 1, wherein the light emitting diode connected to the first exposed portion and the conduction layer through the first exposed portion is within a region of the second exposed portion.

6. The light source apparatus according to claim 1, wherein the first exposed portion is exposed by the second exposed portion in a direction toward the light source of the substrate.

7. The light source apparatus according to claim 1, wherein the second exposed portion has a diameter that is greater than or equal to 2 mm and less than or equal to 4 mm.

8. The light source apparatus according to claim 1, wherein the second protective layer has a thickness that is greater than or equal to 20 μm and less than or equal to 50 μm.

9. The light source apparatus according to claim 1, wherein a step is stepped from the edge of the second exposed portion to a surface of the first protective layer.

10. The light source apparatus according to claim 1, wherein the optical dome comprises silicon or epoxy resin formed onto the light emitting diode and exposed through the second exposed portion.

11. The light source apparatus according to claim 1, wherein the first protective layer and the second protective layer are formed by a photo solder resist (PSR).

12. The light source apparatus according to claim 1, further comprising:

a plurality of antistatic pads, including the antistatic pad.

13. The light source apparatus according to claim 1, wherein the substrate further comprises an insulation layer supporting the conduction layer.

14. The light source apparatus according to claim 13, wherein the conduction layer is a first conduction layer, and the substrate further comprises a second conduction layer supporting the insulation layer.

15. The light source apparatus according to claim 1, wherein the edge of the second exposed portion is spaced apart from the optical dome.

* * * * *